(12) United States Patent
Caputo et al.

(10) Patent No.: US 8,536,289 B2
(45) Date of Patent: Sep. 17, 2013

(54) PROCESS FOR THE PRODUCTION OF POLYOLEFIN FILMS

(75) Inventors: Tiziana Caputo, Ferrara (IT); Monica Galvan, S. Maria Maddalena (IT); Antonio Mazzucco, Ferrara (IT); Paola Massari, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/514,972

(22) PCT Filed: Dec. 17, 2010

(86) PCT No.: PCT/EP2010/070122
§ 371 (c)(1),
(2), (4) Date: Jun. 8, 2012

(87) PCT Pub. No.: WO2011/080128
PCT Pub. Date: Jul. 7, 2011

(65) Prior Publication Data
US 2012/0245314 A1    Sep. 27, 2012

Related U.S. Application Data

(60) Provisional application No. 61/335,621, filed on Jan. 8, 2010.

(30) Foreign Application Priority Data

Dec. 29, 2009  (EP) ..................................... 09180873

(51) Int. Cl.
- *C08F 2/00*    (2006.01)
- *C08F 210/00*  (2006.01)
- *B29C 35/00*   (2006.01)

(52) U.S. Cl.
USPC ............ 526/204; 526/348; 526/216; 264/477

(58) Field of Classification Search
USPC .......................... 526/204, 348, 216; 264/477
See application file for complete search history.

(56) References Cited

U.S. PATENT DOCUMENTS

| | | |
|---|---|---|
| 3,242,150 A | 3/1966 | Scoggin |
| 3,248,179 A | 4/1966 | Norwood |
| 3,917,466 A | 11/1975 | Henry, Jr. et al. |
| 4,416,668 A | 11/1983 | Thompson et al. |

(Continued)

FOREIGN PATENT DOCUMENTS

| | | |
|---|---|---|
| EP | 359444 | 3/1990 |
| EP | 0560035 | 9/1993 |

(Continued)

OTHER PUBLICATIONS

"Database WPI Week 200830", Thomson Scientific, London, GB; AN 2008-E37448 XP002627511, & JP2007 320219 A; Toyo metallising KK Dec. 13, 2007.

*Primary Examiner* — William Cheung

(57) ABSTRACT

A process for the production of a corona-treated polyolefin film comprising the gas-phase polymerization of one or more α-olefins in the presence of a polymerization catalyst and an antistatic agent having a molecular weight higher than 500, said antistatic agent being fed at any stage of the polymerization process in an amount from 30 to 500 ppm weight based on the weight of the produced polyolefin.

7 Claims, 1 Drawing Sheet

(56) References Cited

U.S. PATENT DOCUMENTS

| | | | |
|---|---|---|---|
| 4,739,015 A | 4/1988 | Toyota et al. | |
| 4,803,251 A | 2/1989 | Goode et al. | |
| 5,026,795 A * | 6/1991 | Hogan | 526/74 |
| 6,835,791 B2 | 12/2004 | Ebara et al. | |
| 2010/0072427 A1 | 3/2010 | Posselt et al. | |

FOREIGN PATENT DOCUMENTS

| | | |
|---|---|---|
| EP | 782587 | 7/1997 |
| EP | 1788005 | 5/2007 |
| EP | 1939229 | 7/2008 |
| JP | 2007320219 | 12/2007 |
| RU | 2383520 | 3/2010 |
| WO | WO-9704015 | 2/1997 |
| WO | WO-0000522 | 1/2000 |
| WO | WO-0002929 | 1/2000 |
| WO | WO-0063261 | 10/2000 |
| WO | WO-0240554 | 5/2002 |
| WO | WO-2007131646 | 11/2007 |
| WO | WO-2008107371 | 9/2008 |
| WO | WO-2011072850 | 6/2011 |

* cited by examiner

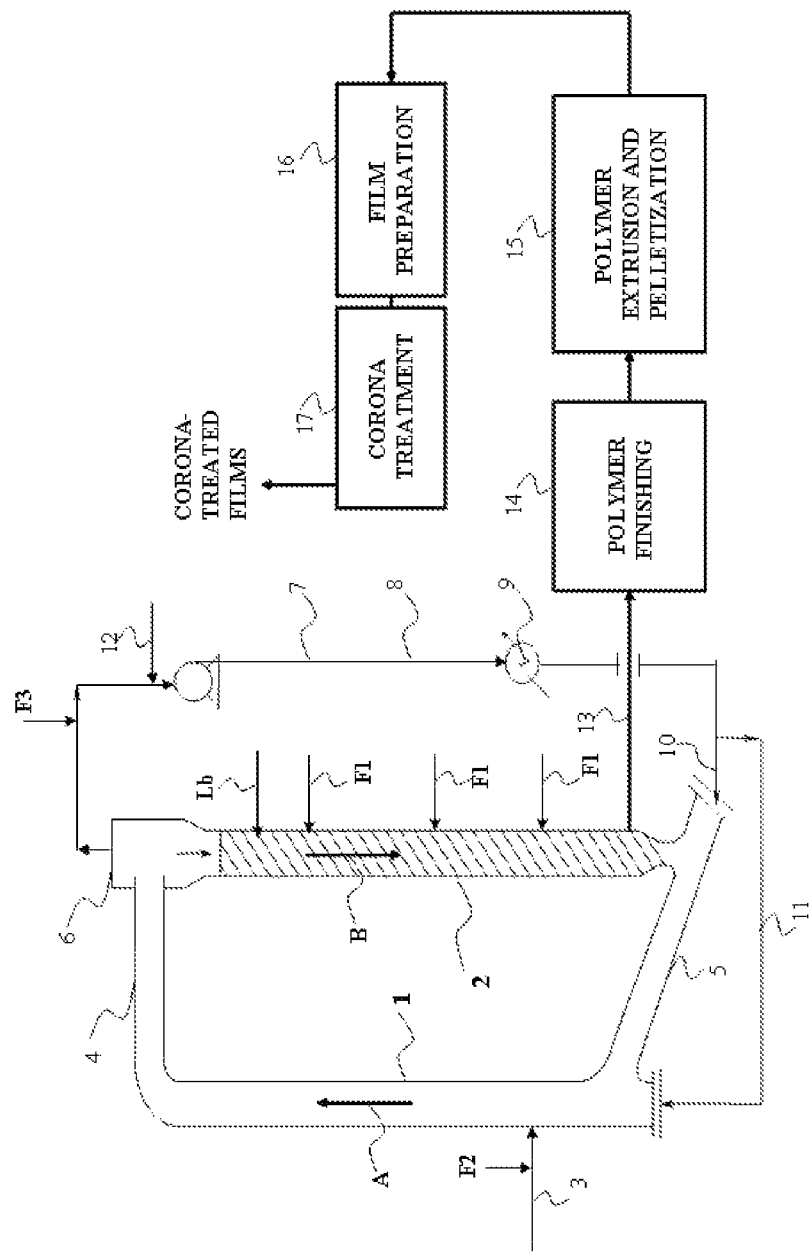

PROCESS FOR THE PRODUCTION OF POLYOLEFIN FILMS

This application is the U.S. national phase of International Application PCT/EP2010/070122, filed Dec. 17, 2010, claiming priority to European Application 09180873.3 filed Dec. 29, 2009 and the benefit under 35 U.S.C. 119(e) of U.S. Provisional Application No. 61/335,621, filed Jan. 8, 2010; the disclosures of International Application PCT/EP2010/070122, European Application 09180873.3 and U.S. Provisional Application No. 61/335,621, each as filed, are incorporated herein by reference.

The present invention relates to a process for the production of corona-treated polyolefin films comprising the gas-phase polymerization of one or more alpha-olefins in the presence of specific antistatic agents. The invention also relates to corona-treated polyolefin films having a high retention of the surface properties given by the corona treatment.

It is known that a relevant problem to be faced during the gas-phase polymerization of olefins is the formation of polymer agglomerates, which can build up in various places, such as the polymerization reactor and the lines for recycling the gaseous stream. When polymer agglomerates form within the polymerization reactor there can be many adverse effects. For example, the agglomerates can disrupt the removal of polymer from the polymerization reactor by plugging the polymer discharge valves. Further, if the agglomerates fall and cover part of the fluidization grid a loss of fluidization efficiency may occur. This can result in the formation of larger agglomerates which can lead to the shutdown of the reactor.

It has been found that agglomerates may be also formed as a result of the presence of very fine polymer particles in the polymerization medium. These fine particles may be present as a result of a poor activity of some catalyst particles or breakage of the catalyst within the polymerization medium. These fine particles are believed to deposit onto and electrostatically adhere to the inner walls of the polymerization reactor and the associated equipment for recycling the gaseous stream such as, for example, the heat exchanger. If the fine particles remain active, in absence of heat removal, then the particles will grow in size resulting in the formation of agglomerates, also caused by the partial melting of the polymer itself These agglomerates when formed within the polymerization reactor tend to be in the form of sheets. Agglomerates can also partially plug the heat exchanger designed to remove the heat of polymerization reaction.

Several solutions have been proposed to solve the problem of formation of agglomerates during a gas-phase polymerization process. These solutions include the deactivation of the fine particles, the control of the catalyst activity, and the reduction of the electrostatic charge in the polymerization medium.

EP 359444 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,739,015 describes the use of gaseous oxygen containing compounds or liquid or solid active-hydrogen containing compounds to prevent the adhesion of the polymer to the inner wall of the polymerization apparatus.

U.S. Pat. No. 4,803,251 describes a process for reducing the polymer sheeting utilizing a group of chemical additives, which generate both positive and negative charges in the reactor, and which are fed to the reactor in an amount of a few parts per million (ppm) per part of the monomer in order to prevent the formation of undesired positive or negative charges.

EP 560035 discloses a polymerization process in which an antistatic compound is used to eliminate or reduce the build-up of polymer particles on the walls of the reactors, or the formation of polymer agglomerates able to cause the fouling of pipes or other plant components. This antistatic compound is preferably selected from polyalcohols having at least 4 carbon atoms, hydroxyesters having at least two free hydroxyl groups, alkyl-diethanolamines, polyepoxidate oils. Said anti-fouling compound may be fed at any stage of the gas-phase polymerization process and is capable to considerably reduce fouling problems inside an olefin polymerization reactor.

However, drawbacks associated with the use of antistatic compounds during the gas-phase polymerization have been observed in case the polyolefin is addressed to be marketed as a film. Most of the conventionally used antistatic agents show a high tendency to migrate towards the surface of a polymeric film, thus causing a negative interference when the film is subjected to a corona treating system.

The corona treatment is a technique useful to increase the surface energy of plastic substrates, so as to increase their adhesion to different materials. For instance, plastic films will generally need some means of surface treatment to achieve acceptable chemical bonding with inks or adhesives. The purpose of a corona treatment is therefore to increase the wettability and adhesion of the plastic substrates.

There are several theories as to how corona treatment increases the surface energy of a plastic substrate: the most commonly accepted theory is that of oxidation. Basically, this theory states that the energy of the corona breaks the molecular bonds on the surface of the non-polar substrate. The broken bonds then recombine with the free radicals in the corona environment to form additional polar groups on the film surface. These polar groups have a strong chemical affinity to the polar inks and adhesives, which results in an improved adhesion. Accordingly, it derives an increase of the surface energy, which is correlated with an improved wettability of the film.

Depending on the particular use to which the plastic film is addressed, a desired "dyne level" has to be achieved during the corona treatment. The "dyne level" is a parameter commonly used in the converting industry and represents a measure of surface energy of a substrate. As previously mentioned, most of the antistatic agents conventionally used during an olefin polymerization shows tendency to migrate towards the surface of the polyolefin film, thus interacting with the polar groups generated on the film surface by the corona treatment. In particular, the "dyne level" conferred by the corona treatment may decay after few days, due to the migration of the antistatic compound to the film surface.

In view of the above technical problem, it would be desirable to individuate particular classes of antistatic agents to be used during the gas-phase polymerization of olefins, said antistatic agents being such to avoid negative interferences with the surface properties of a corona-treated polyolefin film.

The Applicant has now unexpectedly found that the use of particular antistatic agents during the polymerization stage allows the successive preparation of a corona-treated polyolefin films showing a high retention of its surface properties.

BRIEF DESCRIPTION OF THE SEVERAL VIEWS OF THE DRAWINGS

FIG. 1 is a diagrammatic representation of a polymerization process.

It is therefore a first object of the present invention a process for the production of a corona-treated polyolefin film comprising the gas-phase polymerization of one or more α-olefins in the presence of a polymerization catalyst and an antistatic agent having a molecular weight higher than 500, said antistatic agent being fed at any stage of the polymerization process in an amount from 30 to 500 ppm weight based on the weight of the polyolefin being produced.

The process of the present invention applies advantageously to all the gas-phase polymerization processes where the obtained polyolefin particles are successively extruded as a film and subjected to a corona treating system.

The term "polyolefin film" used in the present description includes both conventional plastic films having a thickness in the order of the microns and also sheets and manufactured articles having a thickness in the order of some millimeters.

The terms "anti-fouling agent" or "antistatic agent" are used in the present description to include the following compounds:
  antistatic substances capable of neutralizing the electrostatic charges of the polymer particles;
  catalyst deactivators that partially deactivate the aluminium alkyl co-catalyst, provided that they do not substantially inhibit the overall polymerization activity.

Consequently, an "anti-fouling agent" or "antistatic agent" according to the invention is any substance that is capable to prevent, eliminate or substantially reduce the formation of build-up of polymer on any equipment of the polymerization plant, including sheeting of reactor walls, or deposits of polymer agglomerates onto any line of the polymerization plant, including the gas recycle line.

The process of the invention may be accomplished by means of the following steps:
(i) polymerizing one or more α-olefins in a gas-phase in the presence of an antistatic agent having a molecular weight higher than 500, said antistatic agent being fed at any stage of the polymerization process in an amount from 30 to 500 ppm weight based on the weight of the polymer being produced;
(ii) preparing a monolayer or a multilayer polyolefin film comprising at least a layer formed by extrusion of said polyolefin of step (i);
(iii) subjecting said layer of said polyolefin film to corona treatment so as to produce a corona-treated polyolefin film.

According to the invention the olefin polymerization step (i) is performed in the gas-phase in the presence of an antistatic agent having a molecular weight (MW) higher than 500. A single gas-phase reactor or, alternatively, a sequence of two or more serially connected gas-phase reactors may be used to perform step (i). In particular, the gas-phase olefin polymerization may be performed in one o more polymerization reactors selected from fluidized bed reactors, stirred bed reactors, and gas-phase reactors having two interconnected polymerization zones. A fluidized bed reactor comprises a bed of polymer particles maintained in a fluidized state by the upward flow of gaseous monomer. During the polymerization, fresh polymer is generated by catalytic polymerization of the monomer and polymer product is continuously withdrawn to maintain the bed at a constant volume. Industrial processes employ a distribution plate to dispense the fluidizing gas to the bed, and to act as a support for the bed when the supply of gas is cut off The polymer product is generally withdrawn from the reactor via a discharge conduit arranged in the lower portion of the polymer bed. The fluidizing gas enters the bottom of the reactor and is passed through the distribution plate to the fluidized polymer bed. A gas recycle line is provided in order to continuously recycle the unreacted monomers from top to bottom of the fluidized bed reactor. The recycle line comprises cooling means and a compressor in order to re-introduce the reaction mixture into the reactor at the desired pressure and temperature.

Stirred gas-phase bed reactors have a design similar to fluidized bed reactors with the main difference that the polymer bed is kept in motion and homogenized by means of a vertical helical stirrer, preferably a helical ribbon impeller.

In alternative, gas-phase reactors having two distinct interconnected polymerization zones, as described in EP-B-782587 and EP-B-1012195, may be used to perform the gas-phase polymerization of present invention. In this type of polymerization reactor the polymer particles flow through the first polymerization zone under fast fluidization conditions, leave said first polymerization zone and enter the second polymerization zone through which they flow downward in a densified form, leave said second polymerization zone and are reintroduced into said first polymerization zone, thus establishing a circulation of polymer between said two polymerization zones. The first polymerization zone is also denominated "riser" and is characterized by an upwards flow of polymer under fast fluidization conditions. The second polymerization zone is also denominated "downcomer" and is characterized by a downward flow of polymer under the action of gravity in a packed mode, with a density approaching the bulk density of the polymer.

The antistatic agent of present invention may be fed at any stage of the polymerization step (i): this means that the feed points of the antistatic compound may be anywhere placed in the process set-up, for instance the antistatic compounds may be directly fed into the growing polymer bed and/or along the line feeding the catalyst to the reactor and/or along the gas recycle line. In case of a fluidised bed reactor or a stirred bed reactor, the feed points of said anti-fouling compound are preferably arranged on the line feeding the polymerization catalyst to the reactor, and/or on the gas recycle line of the reactor.

In case of the above described gas-phase reactor with two interconnected polymerization zones, the feed points of said anti-fouling compound are preferably arranged along the downcomer by means of feed lines placed at a different height, as described in patent application PCT/EP2010/062574.

The anti-fouling agent used in the olefin polymerization process of the invention is selected from compounds with a molecular weight (MW) higher than 500, preferably higher than 650.

Suitable anti-fouling agents are selected from the following classes:
  (1) Epoxidized soybean oils, such as EDENOL® D81 (molecular weight of 935);
  (2) Epoxidized linseed oils, such as EDENOL® D316 (molecular weight of 900-1050);
  (3) Polyglycerol esters, such as GRINSTED PGE 080/D (diglycerol monooleate, molecular weight>1000);

The above antifouling agents are liquid compounds at room temperature, generally added to the polymerization reactor in a total amount ranging from 30 to 500 ppm weight, based on the weight of polyolefin produced. Use of lower amounts will be not effective in preventing the reduction of electrostatic charges, while use of larger amounts will adversely affect the operation of the reactor, more specifically depressing the catalyst activity. Preferred amounts of the antifouling agent are within the range from 50 to 250 ppm weight, based on the weight of polyolefin produced.

The anti-fouling agent may be added to the polymerization process neat or diluted in a hydrocarbon solvent, which is useful to improve its dispersion. Suitable hydrocarbon solvents are isopentane, hexane, cyclohexane, heptane.

Particularly preferred are the anti-fouling agents of the class (1), i.e. epoxidized soybean oils. In view of their high viscosity at room temperature, epoxidized soybean oils are preferably metered inside the gas-phase reactor at a feed temperature ranging from 30° C. to 60° C.

The gas-phase polymerization process herewith described is not restricted to the use of any particular family of polymerization catalysts. The polymerization reaction can be carried out in the presence of highly active catalytic systems, such as Ziegler-Natta catalysts, single site catalysts, and chromium-based catalysts.

Preferred polymerization catalysts are Ziegler-Natta catalysts obtained by the reaction of a transition metal compound of groups 4 to 10 of the Periodic Table of Elements (new notation) with an organometallic compound of group 1, 2, or 13 of the Periodic Table of element. In particular, the transition metal compound can be selected among compounds of Ti, V, Zr, Cr, and HE Preferred compounds are those of formula $Ti(OR)_n X_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates.

Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1 C10 hydrocarbon group, internal electron donor compounds can be supported on the $MgCl_2$. Typically, they can be selected among esters, ethers, amines, and ketones. In particular, the use of compounds belonging to 1,3-diethers, cyclic ethers, phthalates, benzoates, acetates and succinates is preferred.

One or more alpha-olefins of formula $CH_2=CHR$, where R is hydrogen or a $C_1$-$C_8$ alkyl radical may be (co)polymerized by means of the above described gas-phase polymerization.

The preferred alpha-olefins are ethylene, propylene, butene-1 and hexene-1.

The obtained polyolefin is extruded to form a monolayer or a multilayer film, which is then subjected to a corona treatment. The corona-treated films according to the invention comprise at least a polyolefin selected from the following classes:
a) isotactic or mainly isotactic propylene homopolymers,
b) Homopolymers or copolymers of ethylene, like HDPE, LDPE, LLDPE;
c) Semi-crystalline copolymers of propylene with ethylene and/or $C_4$-$C_{10}$ α-olefins, such as for example butene-1, hexene-1, 4-methyl-1-pentene, octene-1;
d) elastomeric copolymers of ethylene with propylene and/or a $C_4$-$C_{10}$ α-olefin, optionally containing minor amounts of a diene, such as butadiene, 1,4-hexadiene, 1,5-hexadiene, ethylidene-1-norbornene;
e) heterophasic copolymers comprising a propylene homopolymer and/or one of the copolymers of item c), and an elastomeric fraction comprising one or more of the copolymers of item d), typically prepared according to known methods by mixing the components in the molten state, or by sequential polymerization, and generally containing the said elastomeric fraction in quantities from 5% to 90% by weight;
f) butene-1 homopolymers or copolymers of butene-1 with ethylene and/or other α-olefins.

In more detail, the polymer particles discharged from the gas-phase polymerization reactor are subjected to the conventional steps of polymer finishing, such as monomer degassing, steaming and drying, before to be subjected to the extrusion and pelletization stages. The extrusion has the function of mixing the molten polymer with suitable additives, fillers and pigments and to pump the compounded polymer through a die plate, thus obtaining polymer strands that are cut into pellets by the action of rotating knife blades.

The obtained polymer pellets or strands are then subjected to film extrusion (step ii) for preparing a monolayer or, alternatively, a multilayer polyolefin film comprising at least a layer formed by the polyolefin coming from polymerization step (i). The film extrusion may be accomplished by means of different methods, such as for example, cast extrusion or blown extrusion.

In the cast extrusion the molten polymer is usually extruded through a slot die onto an internally cooled chill roll and successively passes through a series of rollers which will determine the nature and properties of the cast film, including its thickness. The cast film is then cut as required by means of saws, shears or hot wire methods.

Plastic bags and sacks are generally made by blown film extrusion. A blown film is created when the molten plastic material is extruded through a ring-shaped die to form a continuous tube of plastic, which is simultaneously inflated with air to form a plastic bubble. This bubble must be maintained at a constant pressure throughout the production run and passes through variable speed rollers to the point where it reaches the required size. Then the plastic bubble is cooled by air to convert it into a solid film tube of the desired thickness or gauge. The tube is then guided by pinch rolls to become a lay flat film which is wound, slit and trimmed automatically before being converted into a wide range of film and bag products, often involving printing and sealing.

In case of preparation of bi-axially stretched films, such as bi-axially oriented polypropylene (BOPP) films, a tenter frame process or a bubble blowing process may be used.

In the tenter frame process the molten polymer materials are forced in continuous through a narrow slit. The extruded molten material is pulled away from the slit and cooled, then heated again and stretched both in the Machine Direction (MD), generally using heated rolls, and in the Transverse Direction (TD) with a tenter frame.

In the bubble blowing process the molten polymer materials are forced through a circular shaped slip to form a tube. The film can be stretched contemporaneously in Machine and Transverse Direction. In both processes the film can be finally subjected to an annealing (heat set) treatment.

The polyolefin film prepared according to the above extrusion techniques is successively subjected to a corona treatment in order to increase wettability and adhesion of its surface to different materials, such as inks, paints, adhesives.

The corona treatment may be advantageously performed in-line with the film preparation or, alternatively, after the film preparation. In most cases, the corona equipment used to perform step (iii) is integrated into the equipment for the film preparation of step (ii).

The corona-treated polyolefin films obtained by means of present invention show an improved retention of the surface tension provided by the corona treatment equipment.

It is therefore another object of present invention a corona-treated polyolefin film obtained by the above described process, said corona-treated film containing from 30 to 500 ppm weight of an antistatic agent with a molecular weight higher than 500, and being capable to maintain a "dyne level" of at least 40 mN/m for a period of 2 weeks after the corona treatment.

As explained in the technical background of the invention, the "dyne level" is a measure of the surface energy of a substrate and the type of specific application of the film identifies the "dyne level" to be conferred by the corona treatment. Of course, it is desirable to maintain the conferred dyne level as long as possible in the time, so that after many days the surface of the film is still capable to guarantee a good adhesion towards inks or adhesives. The dyne level reflects the surface wettability of the plastic film, the higher the dyne level, the higher the wettability. The dyne level is a measure of the surface tension, therefore its measure is a force per unit length: Newton/meter in SI unit and dyne/cm in cgs unit (1 dyne/cm corresponds to 0.001 N/m).

Generally, the surface energy of a polypropylene or a polyethylene film is such to measure a dyne level of about 20 mN/m. The corona treatment allows to increase the dyne level of the film up to a value in the range of 40-50 mN/m. Most of the applications involving the wettability of the polyolefin film generally require a dyne level of the film not lower than 36-38 mN/m.

The corona-treated film of present invention shows preferably a "dyne level" higher than 42 mN/m for a period of 2 weeks after the corona treatment. The working examples of the invention prove that corona-treated polyolefin films originated from the gas-phase olefin polymerization of step (i) (antistatic compounds with a MW>500), shows a good retention of the dyne level, even after two weeks the corona treatment has been performed. On the contrary, the comparative example of present Application shows that, when using during the olefin polymerization an antistatic agent with a MW<500, the obtained corona-treated film shows a considerable decrease of the dyne level after few days, probably due to the migration of the antistatic compound to the film surface.

The corona-treated polyolefin film of present invention may be monolayer or multilayer. In case of a multilayer film, at least one of the skin layers consists of a polyolefin prepared by the gas-polymerization of the invention and contains from 30 to 500 ppm weight of an antistatic agent having a molecular weight higher than 500, while the other layer(s) may comprise polymers different from polyolefins.

The corona-treated films of the invention are preferably bi-axially oriented polypropylene (BOPP) films, which comprises an intermediate core layer and two skin layers. The core layer is made of a highly crystalline propylene homopolymer or a random copolymer based on propylene. The skin layers are preferably made of random copolymers or terpolymers based on propylene containing little amounts of ethylene and/or 1-butene. In this case, at least one of the two skin layers of the BOPP film is prepared by the gas-phase polymerization of present invention and contains from 30 to 500 ppm weight of an antistatic agent having a molecular weight higher than 500: said skin layer is the one subjected to the corona treatment.

The process of the present invention will now be described in detail with reference to the enclosed figure, which has to be considered illustrative and not limitative of the scope of the invention.

FIG. 1 is a diagrammatic representation of the polymerization process of the invention when applied to the gas-phase polymerization apparatus having two interconnected polymerization zones, as described in EP-B-782587 and EP-B-1012 195. The gas-phase polymerization of olefins is performed in the presence of an antistatic agent having a molecular weight of at least 500.

The gas-phase reactor of FIG. 1 comprises two polymerization zones having a cylindrical shape: the riser 1, where the polymer flows upward under fast fluidization conditions along the direction of arrow A, and the downcomer 2 where the polymer flows downward under the action of gravity along the direction of arrow B.

According to the particular embodiment shown in FIG. 1 a polymerization catalyst is continuously fed via line 3 to the riser 1 of the gas-phase reactor having two interconnected polymerization zones. The riser 1 and the downcomer 2 are appropriately interconnected by the interconnection bends 4 and 5. After flowing through the riser 1, the polymer particles and the gaseous mixture leave the riser 1 and are conveyed to a solid/gas separation zone 6. This solid/gas separation can be effected by using conventional separation means such as, for example, a centrifugal separator (cyclone). From the separation zone 6 the polymer enters the downcomer 2.

The gaseous mixture leaving the separation zone 6 is recycled to the riser 1 by means of a recycle line 7, equipped with a compressor 8 and a heat exchanger 9. Downstream the heat exchanger 9 the recycle line splits into two separated streams: the first one (line 10) conveys the recycle gas into the interconnection bend 5, while the second one (line 11) conveys the recycle gas to the bottom of the riser 1, so as to establish fast fluidization conditions therein.

A gaseous mixture comprising the make-up monomers, hydrogen and propane, as an inert diluent, is continuously fed to the polymerization process through one or more lines 12, suitably placed at any point of the gas recycle line 7, according to the knowledge of the skilled person in art.

The antistatic agent having a molecular weight MW>500 may be fed at any stage of the polymerization process. The process set-up of FIG. 1 comprises three different feeds of the anti-fouling agent. A first feed F1 of said anti-fouling agent is distributed along the height of the downcomer 2 by means of three feed lines arranged along the height of the downcomer 2.

A second feed line F2 of the anti-fouling agent is arranged on the line 3 introducing the polymerization catalyst into the riser 1 and a third portion of the anti-fouling agent is metered in the polymerization process by means of feed line F3, which is arranged on the gas recycle line 7 as shown in FIG. 1.

Polyolefin granules are continuously discharged from the bottom portion of downcomer 2 via the discharge line 13 and are conveyed to a finishing section 14, where the polymer particles are subjected to conventional stages of monomer degassing, steaming and drying as known to the person skilled in the art. Successively, the degassed and dried polymer particles are passed to section 15, where the polyolefin is extruded and pelletized.

The obtained pellets are then conveyed to the film preparation section 16, which may be accomplished by means of different methods, such as cast extrusion, blown extrusion. In case of preparing biaxially stretched films, such as biaxiallly oriented polypropylene (BOPP) films, section 16 comprises the equipment needed to perform the tenter frame or the bubble blowing process. The prepared film is then corona-treated inside section 17, the equipment to perform the corona treatment being advantageously arranged in-line with the film preparation equipment.

The corona treating systems comprise two components: the first component is the power source and the second component is the treater station. In particular, a corona treating system comprises a power source, a high voltage electrode and a ground electrode. A solid dielectric material is needed to cover one of the two electrodes in order to generate a corona atmosphere. In very broad terms, treater stations are classified into two categories: "covered Roll" or "bare Roll".

Covered roll stations have the dielectric covering the ground electrode and the high voltage electrode is bare metal. Bare roll stations have the dielectric covering on the high voltage electrode and the ground electrode is bare metal. In addition to the broad classification of covered roll versus bare roll, treater stations are further classified by the application in which they are used. Typical applications include sheet fed applications, narrow web label presses, flexo/gravure printing presses, coaters/laminators, extrusion coaters, blown film extrusion, cast film extrusion, oriented film extrusion and laboratory treaters.

The most common test to determine the level of surface energy on a substrate is to use an indicator solution, known as dyne solution, applied to the surface of the treated substrate. An example of dyne solution is represented by a mixture of Ethyl Cellosolve and Formamide. This solution usually contains a dye to allow better visibility when applied to the substrate. There are three methods that are generally used to check the surface energy of a substrate using Ethyl Cellosolve and Formamide. They are the cotton-swab applicator method, the dyne-pen method, and the drawdown test method.

Throughout the present description the term "corona-treated film" encompasses not only the films subjected to a corona treatment, but also the films subjected to similar surface treatments aimed to increase the energy surface (dyne level) of the polyolefin film. As a consequence, it should be considered within the scope of the claimed invention not only polyolefin films treated by a corona treatment, but also treated by similar surface treatments, such as atmospheric plasma, flame plasma and chemical plasma treatments.

Atmospheric plasma treatment is very similar to corona treatment, but there some differences between them. Both systems use one or more high voltage electrodes which positively charge the surrounding blown air ion particles. However, in atmospheric plasma systems, the rate oxygen molecules bonding to a material's molecule ends develops up to a 100× more. From this increase of oxygen, a higher ion bombardment occurs. This results in stronger material bonding traits and increased reception for inks and coatings. Atmospheric plasma treatment technology also eliminates a possibility of treatment on a material's non-treated side; also known as backside treatment.

"Flame plasma" treatment generates more heat than other treating processes, but materials treated through this method tend to have a longer shelf-life. These plasma systems are different from air plasma systems, because flame plasma occurs when flammable gas and surrounding air are combusted together into an intense blue flame. Objects' surfaces are polarized from the flame plasma affecting the distribution of the surface's electrons in an oxidation form.

"Chemical plasma" treatment is based on the combination of air plasma and flame plasma. Much like air plasma, chemical plasma fields are generated from electrically charged air. But, instead of air, chemical plasma relies on a mixture of other gases depositing various chemical groups onto the treated surface.

The following examples have to be considered representative and non-limiting of the scope of the present invention.

EXAMPLES

Corona Treatment Equipment

Corona discharge equipment consists of a high-frequency power generator, a high-voltage transformer, a stationary electrode, and a treater ground roll. Standard utility electrical power is converted into higher frequency power which is then supplied to the treater station. The treater station applies this power through metal electrodes over an air gap onto the polyolefin film surface.

Dyne Level Measure

ASTM D 2578-09: In this test method drops of a series of mixtures of formamide and ethyl Cellosolve® of gradually increasing surface tension are applied to the surface of the polypropylene film until a mixture is found that just wets the film surface. The wetting tension of the polypropylene film surface will be approximated by the surface tension of this particular mixture.

-Polymerization catalyst-

A Ziegler-Natta catalyst is used in the following examples, the polymerization catalyst comprising:
 a titanium solid catalyst component prepared with the procedure described in WO 00/63261, Example 10, according to which diethyl 2,3-diisopropyl-succinate is used as an internal donor compound;
 triethylaluminium (TEAL) as a cocatalyst;
 dicyclopentyldimethoxysilane as an external donor.

The above components were pre-contacted in a pre-activation vessel at a temperature of 15° C. for 10 minutes with a weight ratio TEAL/(solid catalyst component) of 5 and a weight ratio TEAL/(external donor) of 3.5.

-Polymerization Conditions-

The above catalyst system is fed to a reactor having two interconnected polymerization zones: the riser 1 and the downcomer 2 (reference is made to FIG. 1). Gas-phase polymerization of propylene with minor amounts of ethylene is performed in this gas-phase reactor using $H_2$ as the molecular weight regulator and propane as a polymerization inert.

The gas-phase polymerization is carried out at a temperature of 75° C. and a pressure of 29 bar. Fast fluidization conditions are established in the riser 1, while the polymer flows downward in a densified form along the downcomer 2.

The gas composition inside the riser 1 and the downcomer 2 is differentiated by feeding a liquid "barrier" of propylene via line $L_b$ in the upper portion of the downcomer 2 according to the teaching of EP-B-1012195. The gaseous composition in the riser and in the downcomer are indicated in TABLE 1, and are such to prepare a propylene/ethylene random copolymer in the riser 1 and a propylene homopolymer in the downcomer 2.

TABLE 1

|  |  | Example 1 (Comp.) | Example 2 | Example 3 | Example 4 |
|---|---|---|---|---|---|
| Temperature (° C.) | | 75 | 75 | 75 | 75 |
| Pressure (bar) | | 29 | 29 | 29 | 29 |
| Riser composition | $H_2$ (% mol) | 3.21 | 6.1 | 0.47 | 1.0 |

TABLE 1-continued

|  |  | Example 1 (Comp.) | Example 2 | Example 3 | Example 4 |
|---|---|---|---|---|---|
| Downcomer composition | $C_2H_4$ (% mol) | 1.02 | 0.4 | 1.6 | 0.8 |
|  | $C_3H_6$ (% mol) | 84.76 | 73.1 | 89.53 | 82 |
|  | $C_3H_8$ (% mol) | 11.01 | 20.4 | 8.4 | 16.2 |
|  | $H_2$ (% mol) | 0.13 | 0.13 | 0.015 | 0.32 |
|  | $C_2H_4$ (% mol) | 0.03 | 0.35 | 1.7 | 0.13 |
|  | $C_3H_6$ (% mol) | 82.79 | 75.6 | 89.28 | 81.75 |
|  | $C_3H_8$ (% mol) | 16.45 | 24.0 | 9 | 17.8 |
| antistatic agent |  | ATMER 163 | EDENOL D81 | EDENOL D81 | EDENOL D81 |
| Reactor output (Kg/h) |  | 98 | 87 | 71 | 89 |
| Antistatic feed (g/h) |  | 12 | 6 | 9 | 20 |
| antistatic/output (ppm wt) |  | 122 | 69 | 126 | 225 |

Example 1 (Comparative)

According to this example the gas-phase polymerization of propylene and ethylene is performed according to the operative conditions indicated in Table 1 and feeding to the reactor an antistatic compound, which is a mixture of alkyldiethanolamines of formula R—N(CH$_2$CH$_2$OH)$_2$ wherein R=$C_{12}$-$C_{18}$ alkyl radical, having a molecular weight (MW) in the range 271-357.

With reference to the embodiment of FIG. 1, ATMER163 is fed to the gas-phase reactor by means of lines F1 arranged along the height of the downcomer 2, line F2 merging in the riser 1 and line F3 placed on the gas-recycle line 8.

ATMER163 is fed in an amount of 122 ppm weight based on the weight of the produced polyolefin. The total feed of ATMER163, the reactor output, and the antistatic/output ratio are also indicated in Table 1.

-Film Preparation-

The obtained blend of propylene/ethylene copolymer and propylene homopolymer is used to prepare A-B-A structured biaxiallly oriented polypropylene (BOPP) films. The poyolefin is biaxially stretched at different temperatures on a laboratory TM long stretcher. The skin layers consisted of the same polyolefin as the core layer.

The machine direction (MD) stretching ratio was 5, while the transverse direction (TD) stretching ratio was 8.5. The processing conditions used in the BOPP line machine are the following:

| Film thickness: | 20 μm | Film width: | 750 mm |
|---|---|---|---|
| Core layer thickness: | 18 μm | Skin layer thickness: | 1 μm |
| Line speed: | 56 m/min | Output winder: | 68 Kg/h |
| MD stretching: | 5 | TD stretching: | 8.5 |
| Melt temperature: | 260° C. |  |  |

-Corona Treatment-

One of the skin layers of the obtained BOPP film is subjected to corona treatment in order to increase its surface tension. The corona treatment is performed in-line with the film preparation.

Table 2 indicates the results in term of "dyne level" on the BOPP film which has been derived by a gas-phase polymerization using ATMER 163 as the antistatic compound. It can be seen that the initial value of 45 dyne/cm quickly decays with the time and after 2 weeks the dyne level of the corona treated film is decreased to 36 dyne/cm, a value not completely satisfactory to ensure a good adhesion of the BOPP film to inks or adhesives.

Examples 2-4

The gas-phase polymerization of propylene and ethylene is performed according to the operative conditions above indicated in Table 1. The antistatic compound is an epoxidized soybean oil (EDENOL® D81) having a molecular weight (MW) of approx 935.

With reference to the embodiment of FIG. 1, EDENOL® D81 is fed to the gas-phase reactor by means of lines F1 arranged along the height of the downcomer 2, line F2 merging in the riser 1 and line F3 placed on the gas-recycle line 8.

The total amount of EDENOL® D81 is differentiated in the examples 2, 3 and 4. The total feed of EDENOL® D 81, the reactor output, and the antistatic/output ratio are indicated in Table 1.

-Film Preparation-

The obtained blend of propylene/ethylene copolymer and propylene homopolymer is used to prepare A-B-A structured biaxiallly oriented polypropylene (BOPP) films. The poyolefin is biaxially stretched at different temperatures on a laboratory TM long stretcher. The skin layers consisted of the same polyolefin as the core layer. The processing conditions used in the BOPP line machine are the same of Example 1.

One of the skin layers of the BOPP film samples is subjected to corona treatment with the same modality of Example 1.

Table 2 indicates the results in term of "dyne level" on the BOPP film which has been derived by the gas-phase polymerization using EDENOL® D81 as the antistatic compound. It can be seen that the initial value of 47 dyne/cm decreases slowly in the time and after 2 weeks the dyne level of the corona treated film is of 42 dyne/cm for the corona treated film of Example 2, and 41 dyne/cm for the corona treated film of Examples 3 and 4. These values of surface tension measured after 2 weeks are still suitable to ensure a good adhesion of the BOPP film to inks or adhesives.

TABLE 2

|  |  | Dyne Level (dyne/cm) | | |
|---|---|---|---|---|
|  | Antistatic | after corona treatment | after 3 days | after 2 weeks |
| Example 1 (Comparative) | ATMER 163 (122 ppm) | 45 | 40 | 36 |
| Example 2 | EDENOL D81 (69 ppm) | 47 | 43 | 42 |
| Example 3 | EDENOL D81 (126 ppm) | 47 | 42 | 41 |
| Example 4 | EDENOL D81 (225 pm) | 47 | 42 | 41 |

The invention claimed is:

1. A process for the production of a corona-treated polyolefin film comprising polymerizing in the gas phase at least one α-olefin in the presence of a polymerization catalyst and an antistatic agent having a molecular weight higher than 500, said antistatic agent being fed at any stage of the polymerization process in an amount from 30 to 500 ppm weight based on the weight of the produced polyolefin.

2. The process according to claim 1 comprising the following steps:
  (i) polymerizing at least one α-olefin in the gas-phase in the presence of said antistatic agent having a molecular weight higher than 500;
  (ii) preparing a monolayer or a multilayer polyolefin film comprising at least a layer formed by extrusion of said polyolefin of step (i); and
  (iii) subjecting said layer of said polyolefin film to a corona treatment so as to produce a corona-treated polyolefin film.

3. The process according to claim 2, wherein said gas-phase polymerization of step (i) is performed in at least one polymerization reactor selected from fluidized bed reactors, stirred bed reactors, and gas-phase reactors having two interconnected polymerization zones.

4. The process according to claim 1, wherein said antistatic agent is selected from the following classes:
  (1) Epoxidized soybean oils;
  (2) Epoxidized linseed oils; or
  (3) Polyglycerol esters.

5. The process according to claim 1, wherein said polyolefin is selected from the following classes:
  a) isotactic or mainly isotactic propylene homopolymers,
  b) homopolymers or copolymers of ethylene,
  c) semi-crystalline copolymers of propylene with ethylene and/or $C_4$-$C_{10}$ α-olefins,
  d) elastomeric copolymers of ethylene with at least one of propylene and a $C_4$-$C_{10}$ α-olefin, optionally containing minor amounts of a diene,
  e) heterophasic copolymers comprising a propylene homopolymer and/or one of the copolymers of item c), and an elastomeric fraction comprising at least one of the copolymers of item d); or
  f) butene-1 homopolymers or copolymers of butene-1 with ethylene and/or other α-olefins.

6. The process according to claim 2, wherein the corona equipment used to perform step (iii) is integrated into the equipment for the film preparation of step (ii).

7. A corona-treated polyolefin film obtained by the process of claim 1, said corona-treated polyolefin film containing from 30 to 500 ppm weight of an antistatic agent with a molecular weight higher than 500 and being capable to maintain a "dyne level" of at least 40 mN/m for a period of 2 weeks after the corona treatment.

* * * * *